(12) United States Patent
Barber et al.

(10) Patent No.: US 8,544,503 B2
(45) Date of Patent: Oct. 1, 2013

(54) FLUID CONDUIT WITH SELF-HEALING PROTECTIVE SLEEVE

(75) Inventors: John R. Barber, Arlington, TX (US); Brian P. Corbett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 608 days.

(21) Appl. No.: 12/279,754

(22) PCT Filed: May 31, 2006

(86) PCT No.: PCT/US2006/021075
§ 371 (c)(1),
(2), (4) Date: Aug. 18, 2008

(87) PCT Pub. No.: WO2008/048203
PCT Pub. Date: Apr. 24, 2008

(65) Prior Publication Data
US 2010/0236654 A1 Sep. 23, 2010

Related U.S. Application Data

(60) Provisional application No. 60/777,211, filed on Feb. 27, 2006.

(51) Int. Cl.
*F16L 57/00* (2006.01)
*F16L 9/14* (2006.01)
*F17C 1/00* (2006.01)

(52) U.S. Cl.
USPC .............. 138/110; 138/148; 220/560.02

(58) Field of Classification Search
USPC .............. 138/110, 140–153; 220/560.01, 220/560.02
See application file for complete search history.

(56) References Cited

U.S. PATENT DOCUMENTS

| 2,308,342 | A |   | 1/1943 | Wilkinson et al. |
| 2,899,984 | A |   | 8/1959 | Gaffin |
| 3,509,016 | A |   | 4/1970 | Underwood et al. |
| 3,698,587 | A | * | 10/1972 | Baker et al. .............. 428/63 |
| 3,830,261 | A | * | 8/1974 | Hochberg et al. ......... 138/127 |
| 3,901,281 | A |   | 8/1975 | Morrisey |
| 3,980,106 | A | * | 9/1976 | Wiggins .................... 138/140 |
| 4,115,616 | A |   | 9/1978 | Heitz et al. |
| 4,216,803 | A |   | 8/1980 | Hall |
| 5,203,378 | A | * | 4/1993 | Williams ................... 138/109 |
| 5,383,567 | A |   | 1/1995 | Sorathia et al. |
| 5,486,425 | A |   | 1/1996 | Seibert |
| 5,865,216 | A | * | 2/1999 | Youngs ..................... 138/135 |
| 2002/0134451 | A1 | * | 9/2002 | Blasko et al. ............. 138/140 |

FOREIGN PATENT DOCUMENTS

| GB | 2263752 | 4/1993 |
| JP | 03-144194 | 6/1991 |
| JP | 3144194 | 6/1991 |

OTHER PUBLICATIONS

Maggie McKee, Golf Ball Polymer 'Heals' Bullet Holes, Aug. 2004, New Scientist Website.*
Surlyn 8940 Datasheet, Jan. 7, 2010, Dupont.*
Chinese Office Action dated Dec. 18, 2009 from 200680053044.4.
Canadian Office Action dated Feb. 8, 2010 from 2,643,351.

(Continued)

*Primary Examiner* — Len Tran
*Assistant Examiner* — Justin Jonaitis
(74) *Attorney, Agent, or Firm* — James E. Walton; Richard G. Eldredge

(57) ABSTRACT

A fluid conduit having a self-healing sleeve in a spaced relationship from the conduit to provide protection against leaks due to ballistic projectiles, such as small arms fire.

8 Claims, 5 Drawing Sheets

(56) References Cited

OTHER PUBLICATIONS

Response to Canadian Office Action dated Feb. 8, 2010 from corresponding Canadian Application No. 2,643,351.
Canadian Office Action from the counterpart Canadian Application No. 2,643,351 issued by the CA Intellectual Property Office on Dec. 7, 2010.
Mexican Examination Report from the counterpart Mexican Application No. 2008-010924 issued by the MX Patent Office on Apr. 29, 2011.
Chinese Office Action from the counterpart Chinese Application No. 2006800530444.
Canadian Examination Report from the counterpart CA Application No. 2,643,351 issued by the Canadian Patent Office on Aug. 17, 2011.
Japanese Examination Report from the counterpart Japanese Application No. 2008-556296 issued by the JP Patent Office on Jul. 14, 2011.
Canadian Office Action dated Apr. 18, 2012 from counterpart Application No. 2,643,351.
Chinese Office Action dated Aug. 27, 2012 from counterpart CN Application No. 200680053044.4.
Chinese Examination Report dated Nov. 19, 2012 from counterpart CN Application No. 200680053044.4.
European Search Report dated Jan. 2, 2013 from counterpart EP Application No. 06851649.1.
Chinese Office Action dated Feb. 21, 2012 from counterpart Application No. 200680053044.4.
Chinese Examination Report dated Mar. 1, 2013 from counterpart CN Application No. 200680053044.4.

\* cited by examiner

FLUID CONDUIT WITH SELF-HEALING PROTECTIVE SLEEVE

GOVERNMENT LICENSE RIGHTS

The U.S. Government has a paid-up license in this invention and the right in limited circumstances to require the patent owner to license others on reasonable terms as provided for by the terms of Contract No. DAAH10-03-2-0006 awarded by RITA, Cost Shared CRAD.

TECHNICAL FIELD

The present invention relates in general to the field of aircraft fuel systems, in particular, aircraft fuel conduits. The present invention could also be applied to protect aircraft lube oil and hydraulic conduits.

DESCRIPTION OF THE PRIOR ART

Self-healing materials have been around for many years. There are various uses for self-healing materials such as natural rubber/polyurethane and nitrile rubber. The main problem with these self-healing materials is that it can take several seconds, even minutes, for these materials to seal after being penetrated. Because of these shortcomings, it has not been advantageous to use these self-healing materials as protective sleeves for aircraft fluid conduits to protect the fluid conduits from leaking in the event the fluid conduits are penetrated by a ballistic projectile.

However, some self-healing materials, such as a self-healing ionomer known as Surlyn® 8940 (available from DuPont Packaging and Industrial Polymers, Wilmington, Del.), seal instantaneously.

Some have attempted to create self-healing laminated conduits, but such conduits are relatively expensive and heavy, and suffer from the slow healing times associated with their components. Additionally, because of the integrated nature of the laminated conduit, pressurized fluids within the laminated conduits exert instantaneous pressure on the projectile opening interfering with the self-healing process.

While the self-healing systems described above represent significant developments, considerable shortcomings remain.

SUMMARY OF THE INVENTION

There is a need for a fluid conduit having a self-healing protective sleeve that heals instantaneously.

Therefore, it is an object of the present invention to provide a fluid conduit having a self-healing protective sleeve that heals instantaneously.

It is another object of this invention to provide a self-healing protective sleeve that may be retrofitted into existing conduit systems.

A further object of this invention is to provide a method for preventing fluid leaks due to projectile impacts on fluid conduits.

These objects are achieved by providing a self-healing protective sleeve that heals instantaneously, a fluid conduit incorporating the protective sleeve, and a method for preventing fluid leaks due to projectiles.

The present invention provides significant advantages, including: (1) the sleeve prevents leakage of vital fluids in the event of a ballistic strike to a fluid conduit; (2) the sleeve can be installed over a conventional fluid conduit; (3) ballistic penetrations can be closed in microseconds; (4) the device may be installed over existing fluid conduits; and (5) aircraft survivability is increased, particularly in the event of small arms ballistic fire.

Further objects and advantages of this invention will become apparent from a consideration of the drawings and ensuing description.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

Self-healing protective fuel conduit sleeves are primarily intended for military applications, because they address improved survivability in the face of small arms ballistic fire. This technology may be applied to any fixed or rotary wing aircraft where fuel leakage, especially after ballistic impact, and fire is a concern.

Figure 1:
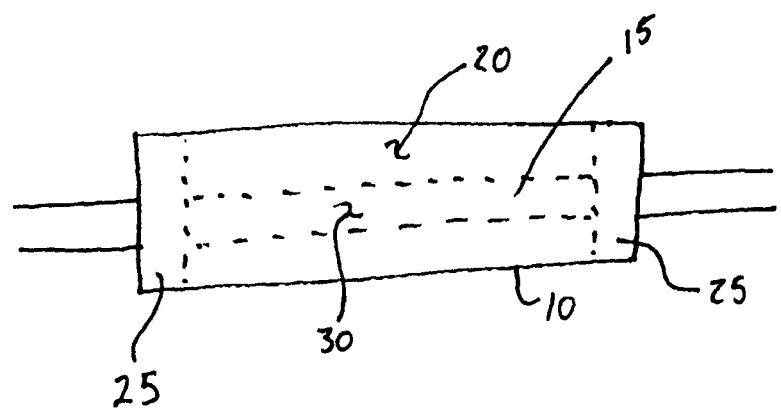
FIG. 1 is a schematic of a fluid conduit having a self-healing protective sleeve according to the preferred embodiment of the present invention.

Referring now to FIG. 1 a sleeve 10 comprised of a self-healing material is installed over a length of conduit 15. Conduit 15 may be standard metal or rubber/nitrile fuel conduit 15, in which case sleeve 10 is proposed for the purpose of containing a fuel leak or preventing a fire after ballistic penetration of the fuel conduit 15 inside of the sleeve 10.

Continuing with FIG. 1, between sleeve 10 and conduit 15 is space 20. Space 20 is created by the difference in size between sleeve 10 and conduit 15 and maintained by seals 25. Seals 25 provide a fluid seal between conduit 15 and sleeve 10 to contain any fluid that may leak from conduit 15 while also positioning sleeve 10 in a spaced relationship from conduit 15 to create space 20. Also shown in FIG. 1 is fluid 30 within conduit 15.

Figure 2:
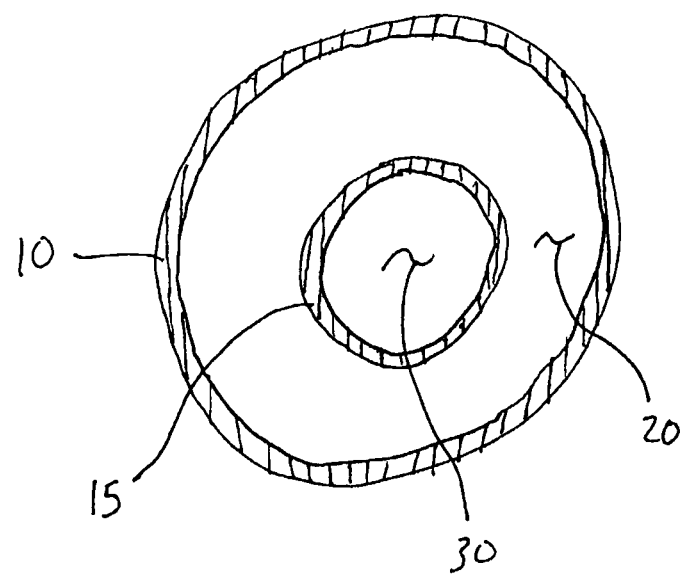
FIG. 2 is a sectional view of the self-healing protective sleeve of FIG. 1.

FIG. 2 is a cross sectional view of the conduit 15 and sleeve 10 of FIG. 1 showing again the fluid 30 within conduit 15 and space 20 between conduit 15 and sleeve 10. While conduit 15 and sleeve 10 are shown having a circular cross section, the invention is not limited to such cross sections. Conduits 15 of any cross section may be enhanced by sleeves 10 of any cross section so long as a space 20 is maintained.

Figure 3:
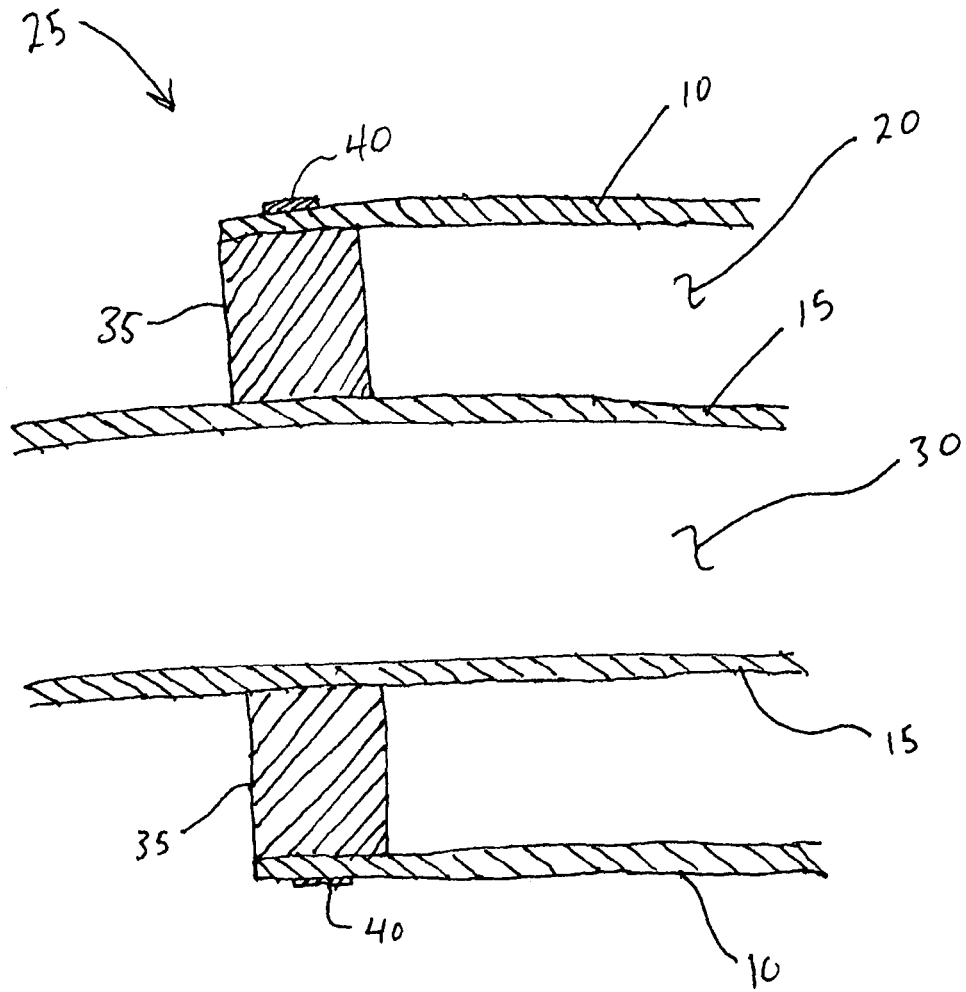
FIG. 3 is a sectional view of the seal on one end of the self-healing protective sleeve of FIG. 1.

FIG. 3 is a sectional view of one embodiment of the seal 25 shown in FIG. 1. A spacer 35 is sized to fit over conduit 15 in a sealing fashion and within sleeve 15 in a sealing fashion. The cross section of spacer 35 is determined by the shapes of both sleeve 10 and conduit 15. Seal 25 may then be secured by a compression strap 40 as shown in FIG. 3 to secure the positioning of spacer 35. This embodiment of seal 25 is shown for exemplary purposes only and it is readily apparent that other sealing means may be used to achieve the invention. For example, sleeve 10 may be tapered into direct sealing engagement with conduit 15. Of importance is that space 20 be maintained and sealed such that fluid 30 that may leak into space 20 is contained within space 20.

Figure 4:
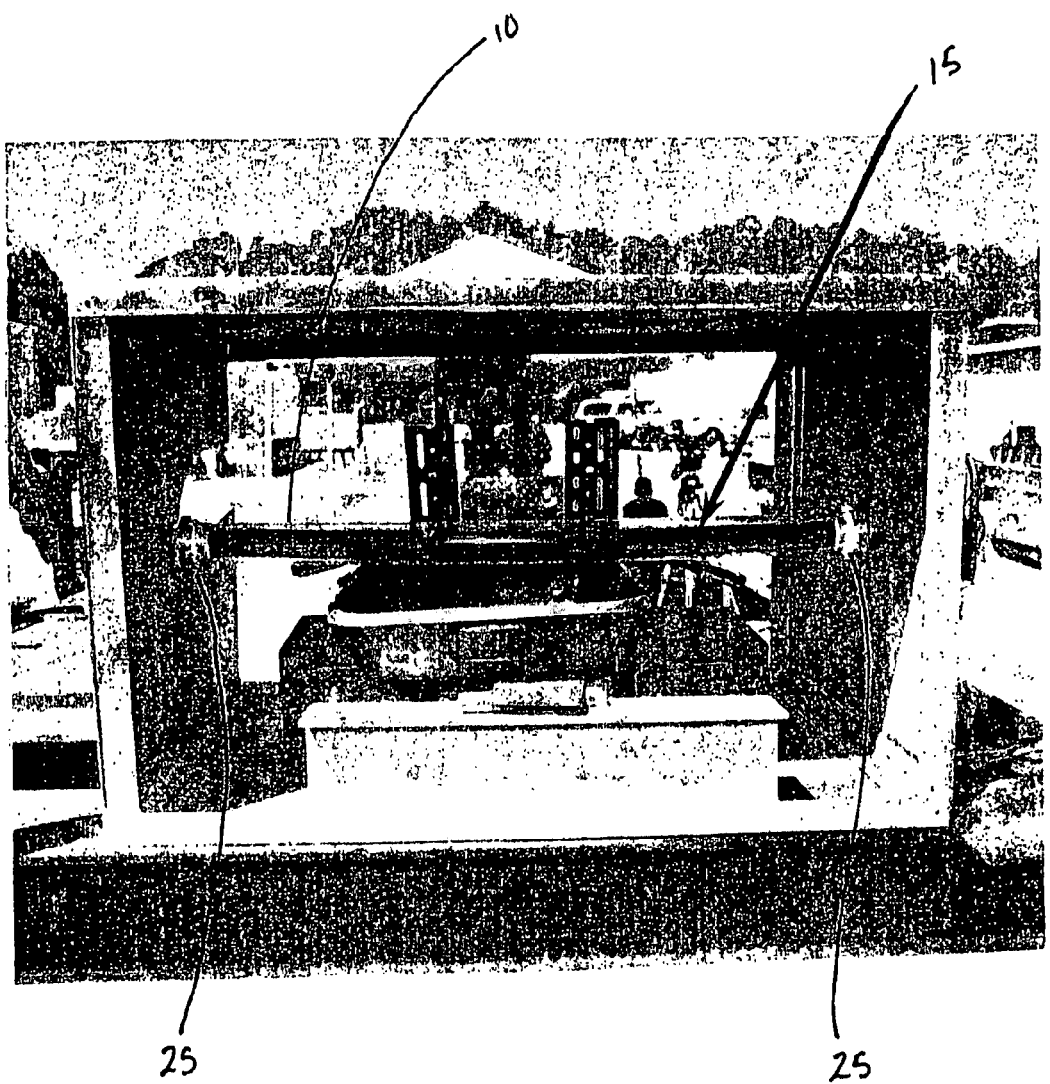
FIG. 4 is a perspective view of a fluid conduit having a self-healing protective sleeve according to the present invention installed in a test chamber prior to penetration by a ballistic projectile.

FIG. 4 is a perspective view of a fluid conduit 15 having a self-healing protective sleeve 10 according to the present invention installed in a test chamber prior to penetration by a ballistic projectile. In this view, conduit 15 is black while sleeve 10 is transparent, thereby highlighting space 20 between conduit 15 and sleeve 10.

Figure 5:
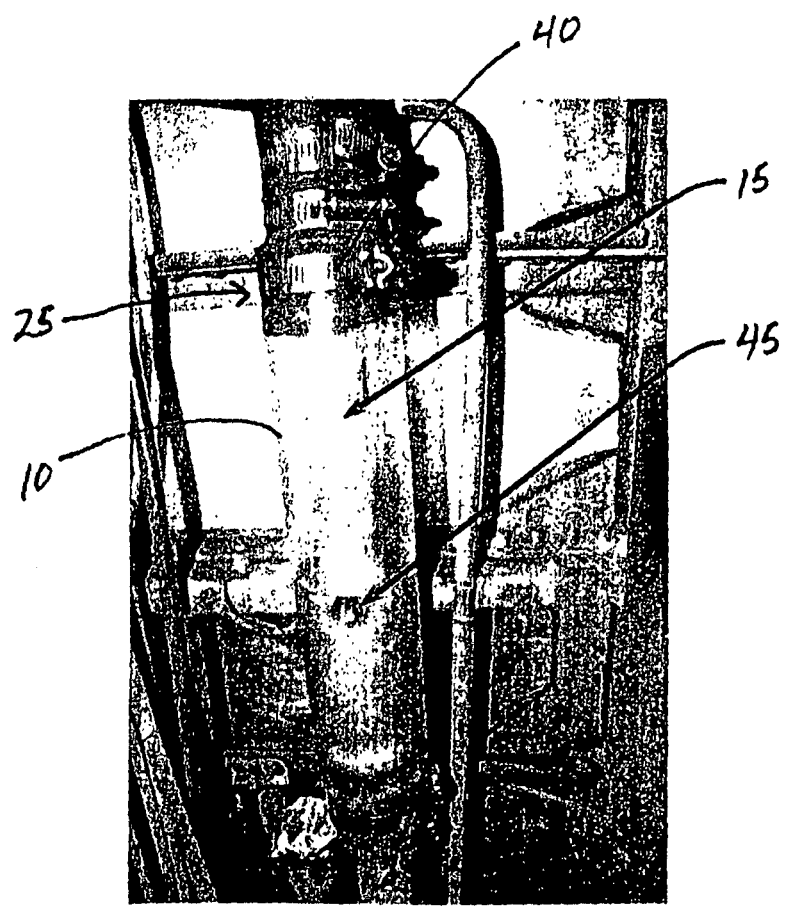
FIG. 5 is a perspective view of a fluid conduit having a self-healing protective sleeve according to the present invention installed in a test chamber after penetration by a ballistic projectile.
Figure 1:
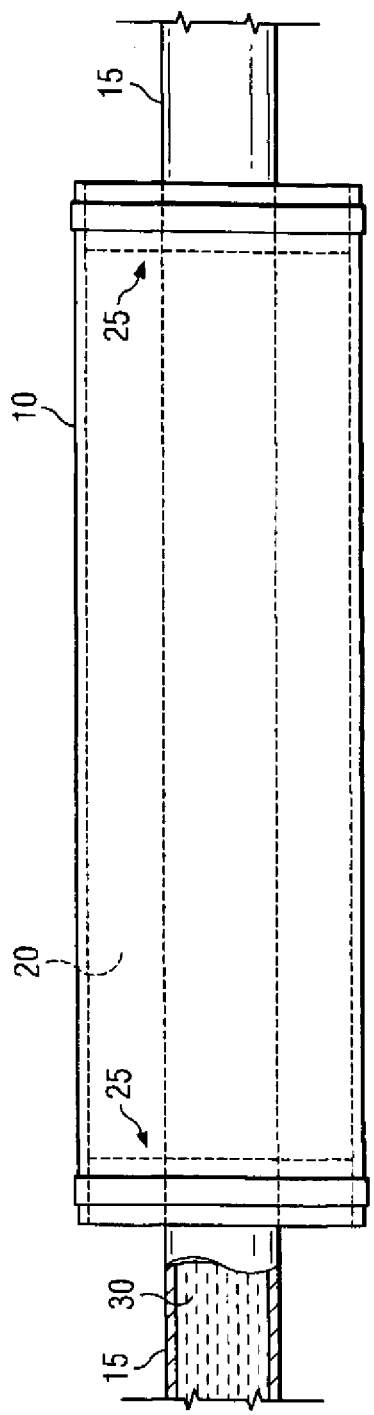
Figure 3:
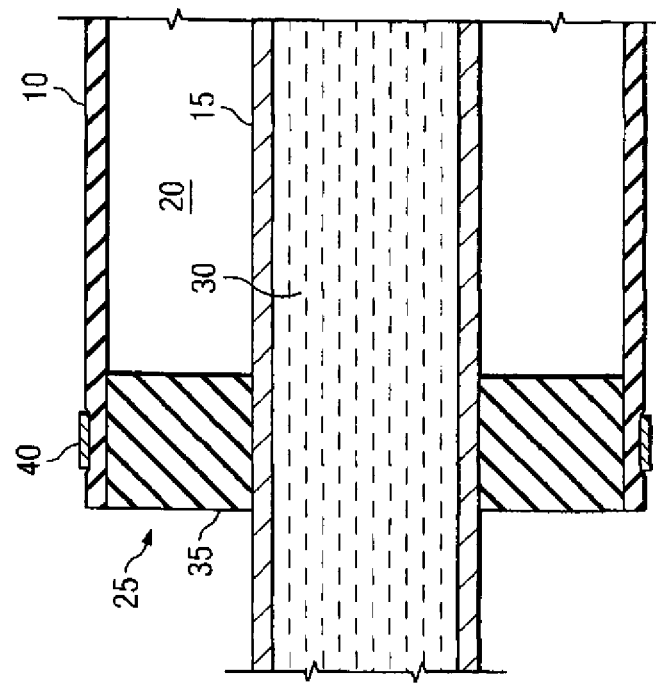
Figure 2:
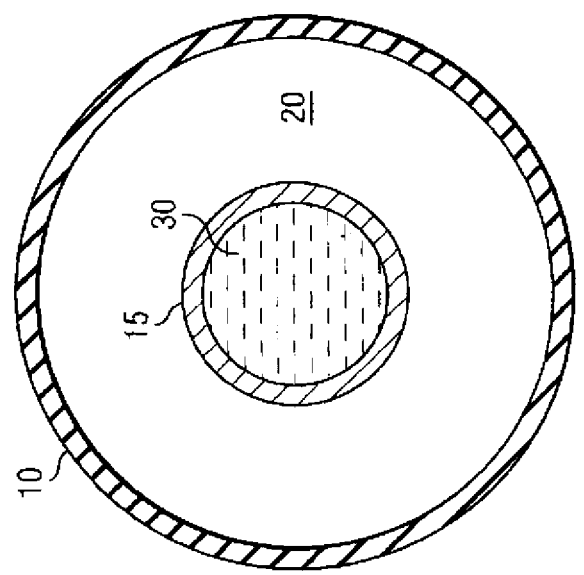
Figure 4:
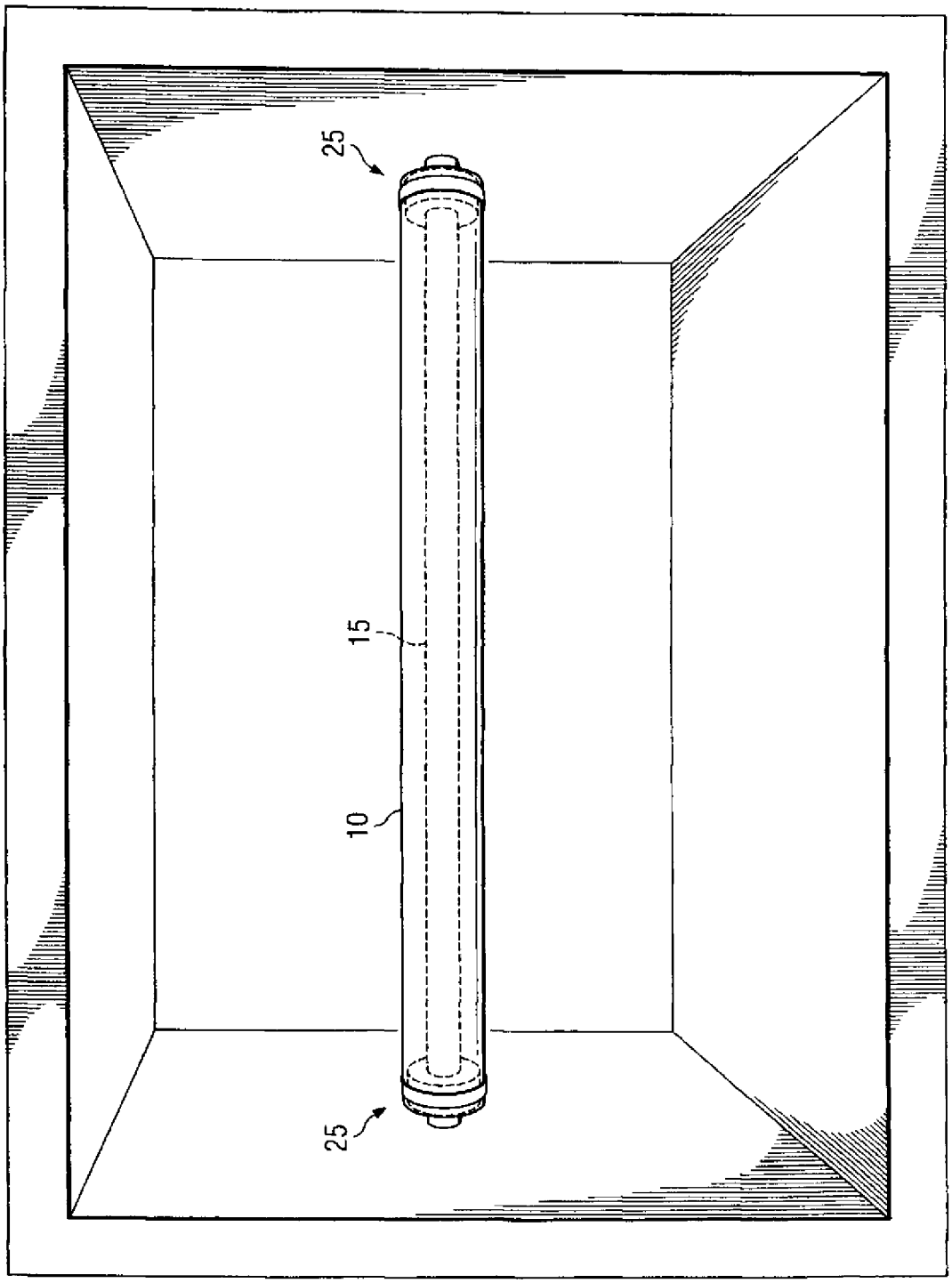
Figure 5:
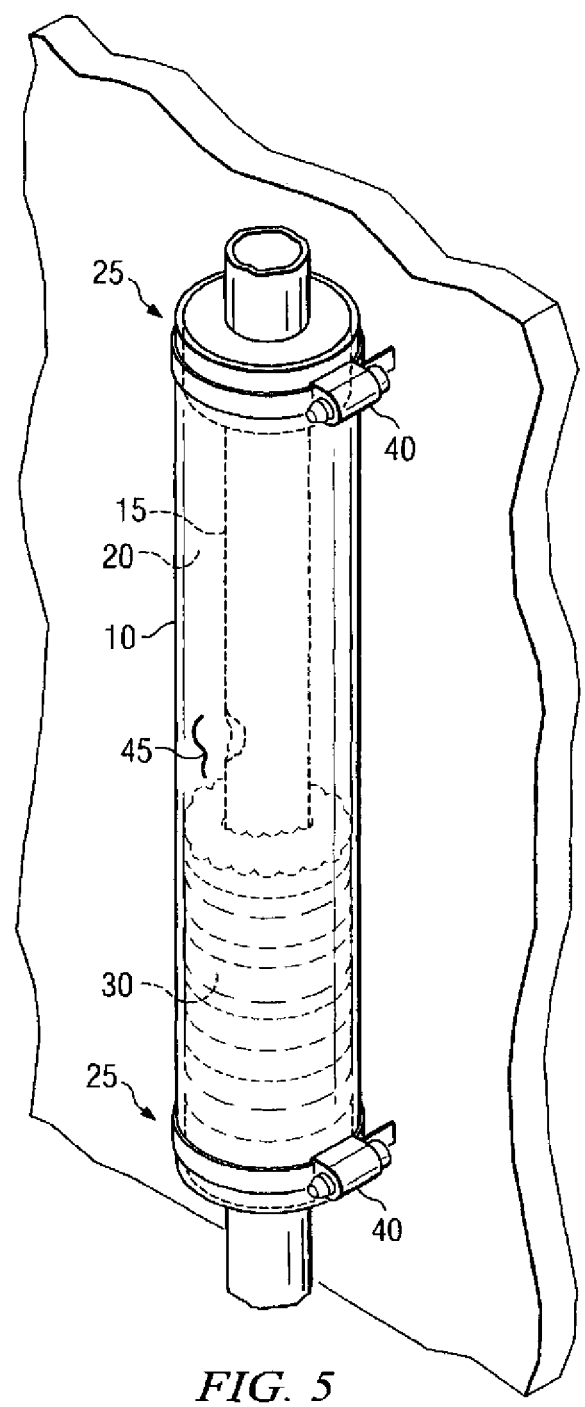

FIG. 5 is a perspective view of a fluid conduit 15 having a self-healing protective sleeve 10 according to the present invention installed in a test chamber after penetration by a ballistic projectile. In this view, fluid 30 is shown partially filling space 20. Fluid 30 has leaked from conduit 15 due to penetration 45 in conduit 15 by a projectile (not shown) but has been contained within space 20 by self-healing sleeve 10 and seals 25.

The proper functioning of sleeve 10 depends on the material selected to create sleeve 10. The self-healing ionomer known commercially as Surlyn® 8940 is particularly well suited for use in sleeve 10. Other similar self-healing materials may also be adaptable to the invention. As shown in FIG. 5, sleeve 10 is self-healing, such that when penetrated with a small projectile the penetration 45 automatically closes nearly instantaneously. By spacing sleeve 10 apart from conduit 15 sleeve 10 is allowed to self-heal prior to fluid 30 being forced into penetration 45.

A method for preventing fluid 30 leaks due to projectiles comprises the steps of: identifying a length of fluid conduit 15 that may be exposed to projectiles; selecting a self-healing sleeve 10 that is sized to be placed over the conduit 15 in a spaced relationship; placing the self-healing sleeve 10 over the conduit 15; securing the sleeve 10 in a spaced relationship with the conduit 15 to create a space 20 between the conduit 15 and the sleeve 10; and sealing the space 20 between the conduit and the sleeve. The method may be further streamlined by completing the securing and spacing in a single step of installing seals 25 that maintain both the spaced relationship and the sealing of the space 20.

The self-healing ionomer used in the present invention self-heals nearly instantaneously, as opposed to conventional self-healing materials that can take several seconds or minutes to seal after perforation. A self-healing protective sleeve 10 works by rapidly (microseconds) closing the ballistic penetration 45 in the sleeve to prevent fuel or other fluids 30 from escaping from the ballistically penetrated sleeve 10 over conduit 15, so as to reduce fluid 30 leak from the conduit 15/sleeve 10 system and to reduce the resulting threat of fire.

The present invention reduces the probability of an aircraft fuel system fire by containing the fuel after penetration of a fuel conduit, and by separating fuel escaping from the fuel source, e.g., conduit, from ignition sources outside the confines of sleeve 10. Installed as a sleeve enveloping a fuel conduit, the sleeve of the present invention can significantly reduce the quantity of fuel escaping into a dry bay, or area surrounding a fuel source, thereby reducing the risk of a sustained fire.

The invention is unique because, unlike conventional self-healing fuel conduits, the present invention uses an instantaneously self-healing ionomer, preferably a Surlyn® ionomer, which self-heals instantaneously as opposed to requiring several seconds or minutes to seal. The present invention is also unique because it is designed to be rapidly installed over existing fuel conduits, as opposed to replacing existing fuel conduits. The combination of the advanced material, e.g., self-healing ionomers or other rapidly self-healing materials, and fuel conduit protection as a sleeve, is considered unique.

While this invention has been described with reference to an illustrative embodiment, this description is not intended to be construed in a limiting sense. Various modifications and other embodiments of the invention will be apparent to persons skilled in the art upon reference to the description.

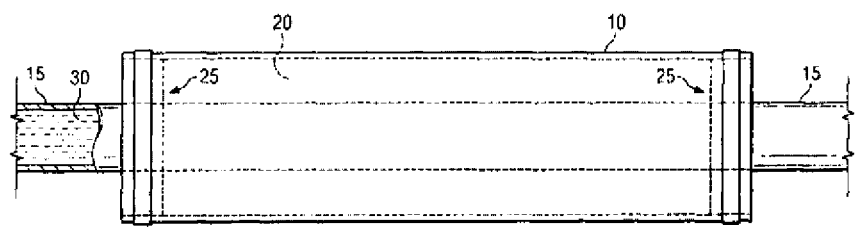

What is claimed is:

1. A protective conduit sleeve, comprising:
   a length of self-healing material sized to be positioned in a spaced relationship over a conduit;
   a first and a second spacer positioned between the self-healing material and the conduit, the spacers being configured to position the self-healing material at the spaced relationship to the conduit, so as to prevent contact between the self-healing material and the conduit, the first and the second spacer extending radially around the conduit; and
   a first and a second compression strap, the first compression strap securing the self-healing material to the first spacer, the second compression strap securing the self-healing material to the second spacer; wherein the first and second spacer and the self-healing material form a fluidly sealed hollow space void of material for receiving fluid leaking from the conduit due to a penetration formed in at least one of the conduit, and the conduit and self-healing material when; and
   wherein the spaced relationship between the self-healing material and the conduit permits the penetration in the self-healing material to close prior to the fluid being forced into the penetration in the self-healing material.

2. The sleeve according to claim 1, wherein the self-healing material is an ionomer resin.

3. The sleeve according to claim 1, wherein the self-healing material is sodium ionomer thermoplastic resin.

4. A fluid conduit system, comprising:
   a conduit for fluid materials, the conduit having a cross section; and
   a self-healing sleeve, the sleeve having:
      a length of self-healing material sized to be positioned in a spaced relationship over a conduit;
      a first and a second spacer positioned between the self-healing material and the conduit, the spacers being configured to position the self-healing material at the spaced relationship to the conduit, so as to prevent contact between the self-healing material and the conduit, the first and the second spacer extending radially around the conduit; and
      a first and a second compression strap, the first compression strap securing the self-healing material to the first spacer, the second compression strap securing the self-healing material to the second spacer;
      wherein the first and second spacer and the self-healing material form a fluidly sealed hollow space void of material for receiving fluid leaking from the conduit due to a penetration formed in at least one of the conduit, and the conduit and self-healing material: and
      wherein the spaced relationship between the self-healing material and the conduit permits the penetration in the self-healing material to close prior to the fluid being forced into the penetration in the self-healing material.

5. The fluid conduit system according to claim 4, wherein the sleeve is comprised of an ionomer resin.

6. The fluid conduit system according to claim 4, wherein the sleeve is comprised of sodium ionomer thermoplastic resin.

7. A method of preventing fluid leaks due to projectiles, the method comprising the steps of:

identifying a length of fluid conduit that may be exposed to projectiles;

selecting a self-healing sleeve that is sized to be placed over the conduit in a spaced relationship;

placing the self-healing sleeve over the conduit, the sleeve contacting a ring-type spacer, the spacer being in direct contact with the conduit, so as to prevent contact between the self-healing sleeve and the conduit;

securing the sleeve in the spaced relationship with the conduit to create a hollow space void of material between the conduit and the sleeve, the ring-type spacer being configured to separate the sleeve from the conduit; and sealing the hollow space between the conduit and the sleeve.

8. The method according to claim 7, wherein the securing and spacing are completed in a single step of installing seals that maintain both the spaced relationship and the sealing of the hollow space.

* * * * *

UNITED STATES PATENT AND TRADEMARK OFFICE
CERTIFICATE OF CORRECTION

| | | |
|---|---|---|
| PATENT NO. | : 8,544,503 B2 | Page 1 of 5 |
| APPLICATION NO. | : 12/279754 | |
| DATED | : October 1, 2013 | |
| INVENTOR(S) | : John R. Barber et al. | |

It is certified that error appears in the above-identified patent and that said Letters Patent is hereby corrected as shown below:

The title page showing the illustrative figure should be deleted to be replaced with the attached title page.

On the title page under item (57), abstract "8 Claims, 5 Drawing Sheets" should read --8 Claims, 3 Drawing Sheets--.

In the drawing sheets, consisting of Figs. 1-5, should be deleted to be replaced with the drawing sheets, consisting of Figs. 1-5, as shown on the attached pages.

Signed and Sealed this
Eighteenth Day of March, 2014

Michelle K. Lee
*Deputy Director of the United States Patent and Trademark Office*

(12) United States Patent
Barber et al.

(10) Patent No.: US 8,544,503 B2
(45) Date of Patent: Oct. 1, 2013

(54) FLUID CONDUIT WITH SELF-HEALING PROTECTIVE SLEEVE

(75) Inventors: John R. Barber, Arlington, TX (US); Brian P. Corbett, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 608 days.

(21) Appl. No.: 12/279,754

(22) PCT Filed: May 31, 2006

(86) PCT No.: PCT/US2006/021075
§ 371 (c)(1),
(2), (4) Date: Aug. 18, 2008

(87) PCT Pub. No.: WO2008/048203
PCT Pub. Date: Apr. 24, 2008

(65) Prior Publication Data
US 2010/0236654 A1    Sep. 23, 2010

Related U.S. Application Data

(60) Provisional application No. 60/777,211, filed on Feb. 27, 2006.

(51) Int. Cl.
*F16L 57/00* (2006.01)
*F16L 9/14* (2006.01)
*F17C 1/00* (2006.01)

(52) U.S. Cl.
USPC ............ 138/110; 138/148; 220/560.02

(58) Field of Classification Search
USPC ............ 138/110, 140–153; 220/560.01, 220/560.02
See application file for complete search history.

(56) References Cited

U.S. PATENT DOCUMENTS

| 2,308,342 | A |   | 1/1943  | Wilkinson et al. |         |
|-----------|---|---|---------|------------------|---------|
| 2,899,984 | A |   | 8/1959  | Gaffin           |         |
| 3,509,016 | A |   | 4/1970  | Underwood et al. |         |
| 3,698,587 | A | * | 10/1972 | Baker et al.     | 428/63  |
| 3,830,261 | A | * | 8/1974  | Hochberg et al.  | 138/127 |
| 3,901,281 | A |   | 8/1975  | Morrisey         |         |
| 3,980,106 | A | * | 9/1976  | Wiggins          | 138/140 |
| 4,115,616 | A |   | 9/1978  | Heitz et al.     |         |
| 4,216,803 | A |   | 8/1980  | Hall             |         |
| 5,203,378 | A | * | 4/1993  | Williams         | 138/109 |
| 5,383,567 | A |   | 1/1995  | Sorathia et al.  |         |
| 5,486,425 | A |   | 1/1996  | Seibert          |         |
| 5,865,216 | A | * | 2/1999  | Youngs           | 138/135 |
| 2002/0134451 | A1 | * | 9/2002 | Blasko et al.   | 138/140 |

FOREIGN PATENT DOCUMENTS

| GB | 2263752    | 4/1993 |
| JP | 03-144194  | 6/1991 |
| JP | 3144194    | 6/1991 |

OTHER PUBLICATIONS

Maggie McKee, Golf Ball Polymer 'Heals' Bullet Holes, Aug. 2004, New Scientist Website.*
Surlyn 8940 Datasheet, Jan. 7, 2010, Dupont.*
Chinese Office Action dated Dec. 18, 2009 from 200680053044.4.
Canadian Office Action dated Feb. 8, 2010 from 2,643,351.

(Continued)

*Primary Examiner* — Len Tran
*Assistant Examiner* — Justin Jonaitis
(74) *Attorney, Agent, or Firm* — James E. Walton; Richard G. Eldredge

(57) ABSTRACT

A fluid conduit having a self-healing sleeve in a spaced relationship from the conduit to provide protection against leaks due to ballistic projectiles, such as small arms fire.

8 Claims, 3 Drawing Sheets